(12) United States Patent
Johnson

(10) Patent No.: US 8,225,321 B2
(45) Date of Patent: Jul. 17, 2012

(54) EFFICIENT ENFORCED RESOURCE CONSUMPTION RATE LIMITS

(75) Inventor: Andrew Johnson, Hampshire (GB)

(73) Assignee: International Business Machines Corporation, Armonk, NY (US)

(*) Notice: Subject to any disclaimer, the term of this patent is extended or adjusted under 35 U.S.C. 154(b) by 1389 days.

(21) Appl. No.: 11/829,474

(22) Filed: Jul. 27, 2007

(65) Prior Publication Data
US 2008/0059969 A1    Mar. 6, 2008

(30) Foreign Application Priority Data
Aug. 31, 2006 (GB) .................................. 0617115.1

(51) Int. Cl.
*G06F 9/46* (2006.01)
(52) U.S. Cl. ......................................... 718/104
(58) Field of Classification Search .................. 718/104
See application file for complete search history.

(56) References Cited

U.S. PATENT DOCUMENTS

| | | | | |
|---|---|---|---|---|
| 6,601,083 B1* | 7/2003 | Reznak | ........................ | 718/104 |
| 6,701,420 B1* | 3/2004 | Hamilton et al. | ............. | 711/170 |
| 6,940,437 B2* | 9/2005 | Trotter et al. | ................ | 341/143 |
| 6,941,437 B2* | 9/2005 | Cook et al. | ..................... | 711/173 |
| 7,409,517 B2* | 8/2008 | Dageville et al. | ............. | 711/170 |
| 7,412,492 B1* | 8/2008 | Waldspurger | ................. | 709/216 |
| 2002/0111983 A1* | 8/2002 | Hendrickson et al. | ........ | 709/104 |
| 2005/0064769 A1* | 3/2005 | Roos | ............................... | 440/38 |
| 2006/0005198 A1* | 1/2006 | Uchishiba et al. | ............ | 718/104 |
| 2006/0143617 A1* | 6/2006 | Knauerhase et al. | ......... | 718/104 |
| 2007/0094666 A1* | 4/2007 | Ode | ............................... | 718/104 |

FOREIGN PATENT DOCUMENTS
EP        1607863        12/2005

OTHER PUBLICATIONS

Moreira et al. Multiprocessor Resource Allocation for Hard-real-tiem Streaming with a Dynamic job-mix, IEEE, 2005, pp. 1-10.*

* cited by examiner

*Primary Examiner* — Diem Cao
(74) *Attorney, Agent, or Firm* — Steven M. Greenberg, Esq.; Carey, Rodriguez, Greenberg & O'Keefe (57) ABSTRACT

A method for enforcing a consumption rate limit for a resource in a data processing system includes receiving a first request for consumption of the resource; calculating an accumulated resource availability using the consumption rate limit; in response to a determination that the accumulated resource availability is sufficient to satisfy the first request, satisfying the first request; calculating a residual resource availability; receiving a second request for consumption of the resource; calculating an additional accumulated resource availability using the consumption rate limit unless the residual resource availability is sufficient to satisfy the second request.

17 Claims, 5 Drawing Sheets

EFFICIENT ENFORCED RESOURCE CONSUMPTION RATE LIMITS

BACKGROUND OF THE INVENTION

Field of the Invention

The present invention relates to providing efficient enforced resource consumption rate limits. In particular, it relates to determining when to recalculate resource availability.

Rates of resource consumption in data processing systems can vary considerably under different circumstances and it can be necessary to ensure stable and effective operation by imposing a limit on a rate of consumption of a particular resource. For example, heap memory used for the allocation of data by software applications can be consumed at varying rates. Excessively high rates of memory allocation can result in memory shortage and other consequences in a garbage collected memory system, for example, excessively high rates of memory allocation can result in an overloaded garbage collector which can affect the performance of the entire data processing system as the garbage collector may dominate processing. Other examples can include limits to the rate of transfer of data over a communications medium such as a data bus, communications link or network.

Typically, a resource consumer in operation in a data processing system will make requests for varying quantities of resource at various different times. The data processing system must determine whether such requests would cause a predetermined consumption rate limit to be exceeded. Such a determination is used to permit or deny such resource consumption requests.

One technique for undertaking this determination is to calculate a moving average of the consumption rate. If the time and quantity of each resource consumption is recorded then the total allocations over a predetermined period of time can be calculated and an average consumption rate determined. This approach has the disadvantage that such calculations can be resource expensive (e.g. in terms of processing resource) since calculations are required periodically (such as at each request for resource consumption) to determine the average consumption rate.

It would therefore be advantageous to provide for the enforcement of resource consumption rate limits which provide a more efficient determination of whether to permit or deny a request for resource consumption in view of the required resource consumption rate limit.

BRIEF SUMMARY OF THE INVENTION

The present invention accordingly provides, in a first aspect, a method for enforcing a consumption rate limit for a resource in a data processing system, the method comprising the steps of: receiving a first request for consumption of the resource; calculating an accumulated resource availability using the consumption rate limit; in response to a determination that the accumulated resource availability is sufficient to satisfy the first request, satisfying the first request; calculating a residual resource availability; receiving a second request for consumption of the resource; calculating an additional accumulated resource availability using the consumption rate limit unless the residual resource availability is sufficient to satisfy the second request.

Thus a calculation of additional accumulated resource availability for the second request is made only when the residual resource availability is insufficient to satisfy the second request. In this way the relatively expensive operation of calculating additional accumulated resource availability is deferred to be undertaken only when absolutely necessary and not routinely. Consequently, enforcing the consumption rate limit for resource consumption requests from the resource consumer is less resource intensive, less expensive and more efficient.

The step if calculating an additional accumulated resource availability further comprises the step of, in response to a determination that a combination of the residual resource availability and the additional accumulated resource availability is sufficient to satisfy the second request, satisfying the second request.

The step of satisfying the second request comprises: updating the residual resource availability to include the additional accumulated resource availability; and in response to a determination that the updated residual resource availability is sufficient to satisfy the second request, satisfying the second request and recalculating the residual resource availability.

The accumulated resource availability is calculated as a product of a first elapsed time and the consumption rate limit, and the additional accumulated resource availability is calculated as a product of a second elapsed time and the consumption rate limit.

The first elapsed time is an elapsed time up to the receipt of the first request.

The second elapsed time is an elapsed time between the receipt of the first request and the receipt of the second request.

The additional accumulated resource availability is constrained to a maximum additional accumulated resource availability.

The additional accumulated resource availability is constrained to a maximum additional accumulated resource availability by constraining the second elapsed time to a maximum second elapsed time.

The combination of the residual resource availability and the additional accumulated resource availability is constrained to a maximum resource availability.

The resource is a memory in the data processing system. Preferably the first and second requests for consumption of the resource are requests for allocation of memory.

The present invention accordingly provides, in a second aspect, an apparatus for enforcing a consumption rate limit for a resource in a data processing system, the apparatus comprising: means for receiving a first request for consumption of the resource; means for calculating an accumulated resource availability using the consumption rate limit; means for, in response to a determination that the accumulated resource availability is sufficient to satisfy the first request, satisfying the first request; means for calculating a residual resource availability; means for receiving a second request for consumption of the resource; means for calculating an additional accumulated resource availability using the consumption rate limit unless the residual resource availability is sufficient to satisfy the second request.

The means for calculating an additional accumulated resource availability further comprises means for, in response to a determination that a combination of the residual resource availability and the additional accumulated resource availability is sufficient to satisfy the second request, satisfying the second request.

The means for satisfying the second request comprises: means for updating the residual resource availability to include the additional accumulated resource availability; and means for, in response to a determination that the updated residual resource availability is sufficient to satisfy the second request, satisfying the second request and recalculating the residual resource availability.

The present invention accordingly provides, in a third aspect, an apparatus comprising: a central processing unit; a memory subsystem; an input/output subsystem; and a bus subsystem interconnecting the central processing unit, the memory subsystem, the input/output subsystem; and the apparatus as described above.

The present invention accordingly provides, in a fourth aspect, a computer program element comprising computer program code to, when loaded into a computer system and executed thereon, cause the computer to perform the steps of a method as described above.

BRIEF DESCRIPTION OF THE DRAWINGS

A preferred embodiment of the present invention is described below in more detail, by way of example only, with reference to the accompanying drawings, in which.

DETAILED DESCRIPTION OF THE PREFERRED EMBODIMENT

Figure 1:
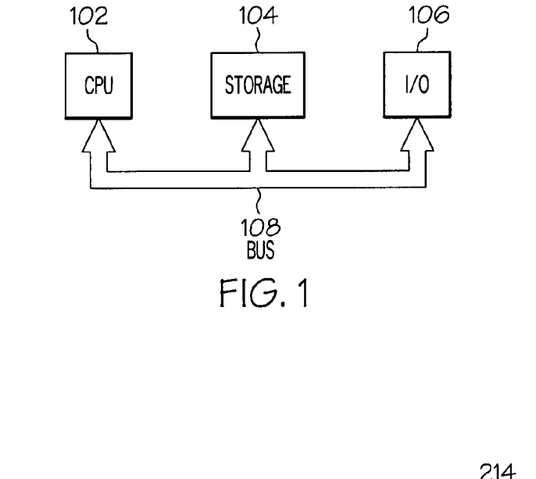
FIG. 1 is a block diagram of a computer system suitable for the operation of embodiments of the present invention.

FIG. 1 is a block diagram of a computer system suitable for the operation of embodiments of the present invention. A central processor unit (CPU) 102 is communicatively connected to a storage 104 and an input/output (I/O) interface 106 via a data bus 108. The storage 104 can be any read/write storage device such as a random access memory (RAM) or a non-volatile storage device. An example of a non-volatile storage device includes a disk or tape storage device. The I/O interface 106 is an interface to devices for the input or output of data, or for both input and output of data. Examples of I/O devices connectable to r/o interface 106 include a keyboard, a mouse, a display (such as a monitor) and a network connection.

Figure 2:
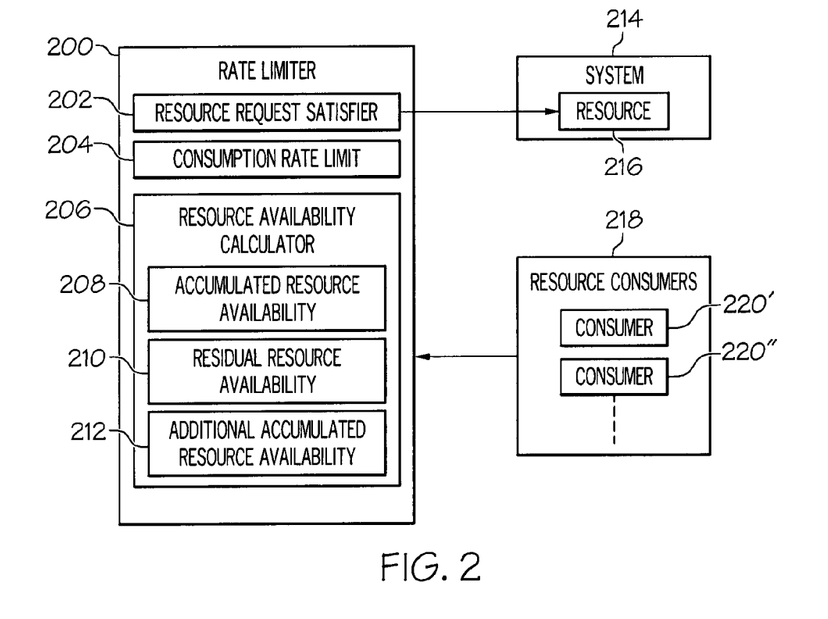
FIG. 2 is a block diagram of a resource consumption rate limiter for determining whether to satisfy a request for consumption of a resource from a resource consumer in accordance with a preferred embodiment of the present invention.

FIG. 2 is a block diagram of a resource consumption rate limiter 200 for determining whether to satisfy a request for consumption of a resource 216 from a resource consumer 220 in accordance with a preferred embodiment of the present invention. A data processing system 214 is an entity having associated a consumable resource 216, such as a computer system, pervasive device, domestic appliance, network infrastructure, virtual data processing entity, virtual processing unit or other resource container which will be apparent to those skilled in the art. The resource 216 can be storage, such as memory either virtual, physical, volatile, non-volatile or a combination of any or all of these, a network resource such as a communications medium having a particular throughput, an output device such as in an audio or visual output means, an input device, a streaming resource, a remote resource such as a remote network entity or other resource type which will be apparent to those skilled in the art. The resource 216 is consumable by resource consumers 218 including individual consumers 220. Each resource consumer 220 can be a software or hardware entity including, for example: a software function, procedure or method; an object in an object oriented software application; a woven aspect at runtime in an aspect oriented software environment; a subroutine; a computer program; a data processing system such as those described above; a processor such as a central processing unit; a graphics, audio or other medial processor, preprocessor or postprocessor; a storage, peripheral or other device controller; or other resource consumers which will be apparent to those skilled in the art.

Consumption of the resource 216 by a resource consumer 220 is undertaken via a resource consumption rate limiter 200. The rate limiter 200 is a software or hardware entity operable to enforce resource consumption rate limits in accordance with a consumption rate limit 204, described below. In use, a resource consumer 220 makes a request to the rate limiter 200 to consume a particular quantity of resource 216 and the rate limiter 200 determines whether to permit or deny the request. The consumption rate limit 204 is a predetermined limit of the rate of consumption of the resource 216. For example, if the resource 216 is a memory resource, the consumption rate limit 204 can be expressed as a quantity of memory in a unit of time. Alternatively, if the resource 216 is a data communications resource such as a network resource, the consumption rate limit 204 can be expressed as a quantity of data in a unit of time (such as a data communications rate). The rate limiter 200 further includes a resource availability calculator 206 for calculating the availability of resource for a particular consumer 220'.

Resource availability calculator 206 preferably calculates an accumulated resource availability 208 for a first request to consume a quantity of the resource 216. The accumulated resource availability 208 can be calculated as a product of the consumption rate limit 204 and an elapsed time. The elapsed time can be a time elapsed up to the receipt by the rate limiter 200 of the first request to consume the resource 216. Thus the accumulated resource availability 208 is a maximum quantity of the resource 216 which could be consumed by the resource consumer 220' over that elapsed time period without exceeding the consumption rate limit 204. If the quantity of the resource 216 requested for consumption in the first request from the consumer 220' can be satisfied by the accumulated resource availability 208, then rate limiter 200 permits the satisfaction of the first resource consumption request. Alternatively, if the quantity of the resource 216 requested for consumption in the first request from the consumer 220' cannot be satisfied by the accumulated resource availability 208, then rate limiter 200 denies the first resource consumption request since it would result in the consumer 220' exceeding the consumption rate limit 204. Permitted resource consumption requests are satisfied by a resource request satisfier 202 which is operable to provide the requested quantity of the resource 216.

The resource availability calculator 206 further preferably calculates a residual resource availability 210 following satisfaction of a request to consume a quantity of resource 216. For example, if the rate limiter 200 determines that the first request to consume a quantity of the resource 216 is permitted, the resource availability calculator 206 subsequently calculates a residual resource availability 210 as a quantity of resource available from the accumulated resource availability 208 following satisfaction of the first request. i.e. if a first request from the consumer 220' to consume a quantity of the resource 216 is permitted by the rate limiter 200 and satisfied by the satisfier 202 with reference to an accumulated resource availability 208 of x, then the residual resource availability 210 is calculated to be the accumulated resource available following satisfaction of this first request, (x−y). The residual resource availability 210 is calculated for subsequent requests from consumer 220' to consume a quantity of resource. On receipt of such a subsequent request by the rate limiter 200, a quantity of resource 216 requested can be compared with the residual resource availability 210 to determine if there is sufficient residual resource 210 available to satisfy the subsequent request. Only if there is not sufficient residual resource 210 available should a further, relatively expensive calculation of additional accumulated resource 212 be required, as described below.

An additional accumulated resource availability 212 is calculated when the resource availability calculator 206 receives a subsequent request for the consumption of a quantity of resource 216 from consumer 220' which cannot be satisfied by the known residual resource availability 210 alone. For example, if a subsequent request is received from consumer 220' for consumption of a quantity of resource 216 which is greater than the known residual resource availability 210, the resource availability calculator 206 must calculate additional accumulated resource availability 212. The additional accumulated resource availability 212 can be calculated as a product of the consumption rate limit 204 and an elapsed time. The elapsed time for the calculation of the additional accumulated resource availability can be a time elapsed between the receipt of the first request for consumption of resource 216 and the receipt of the subsequent request. Thus the additional accumulated resource availability 212 is a maximum quantity of the resource 216 which could be consumed by the resource consumer 220' over that elapsed time period without exceeding the consumption rate limit 204. On calculation of the additional accumulated resource availability 212, the rate limiter 200 can determine if such a subsequent request for consumption of a quantity of the resource 216 from consumer 220' can be satisfied by a combination of the residual resource availability 210 and the additional accumulated resource availability 212. Such a combination will normally be a mere summation of the residual resource availability 210 and the additional accumulated resource availability 212. Preferably, the residual resource availability 210 is updated to include the calculated additional accumulated resource availability 212 such that the rate limiter 200 can determine whether a subsequent request from the consumer 220' can be satisfied with reference only to the updated residual resource availability 210. For example, the residual resource availability 210 is updated by adding the value of the additional accumulated resource availability 212.

Thus it can be seen that the rate limiter 200 is required to calculate the additional accumulated resource availability 212 for a subsequent request to consume resource only when a value of the residual resource availability 210 is insufficient to satisfy such a subsequent request. In this way the relatively expensive operation of calculating additional accumulated resource availability 212 is deferred to be undertaken only when absolutely necessary. Consequently, the present approach to enforcing the consumption rate limit 204 for resource consumption requests from the resource consumer 220' is less resource intensive, less expensive and more efficient.

Whilst the various elements of FIG. 2 have been described in accordance with their particular arrangement as illustrated, it will be apparent to those skilled in the art that this is not the only arrangement of such elements and the elements can be organized in different arrangements while still affording the advantages described above. In particular, either or both of the resource consumers 218 and the rate limiter 200 can form part of the system 214. Otherwise, the elements of FIG. 2 are communicatively connected in order that the functions and features of the preferred embodiment of the present invention can be realized. In particular, the resource consumers 218 are communicatively connected to the rate limiter 200 such as via an application programming interface, a communications interface, a network, a common bus, or other such effective communications mechanism. Similarly, the resource request satisfier 202 component of the rate limiter 200 is communicatively connected to the resource 216.

Figure 3A:
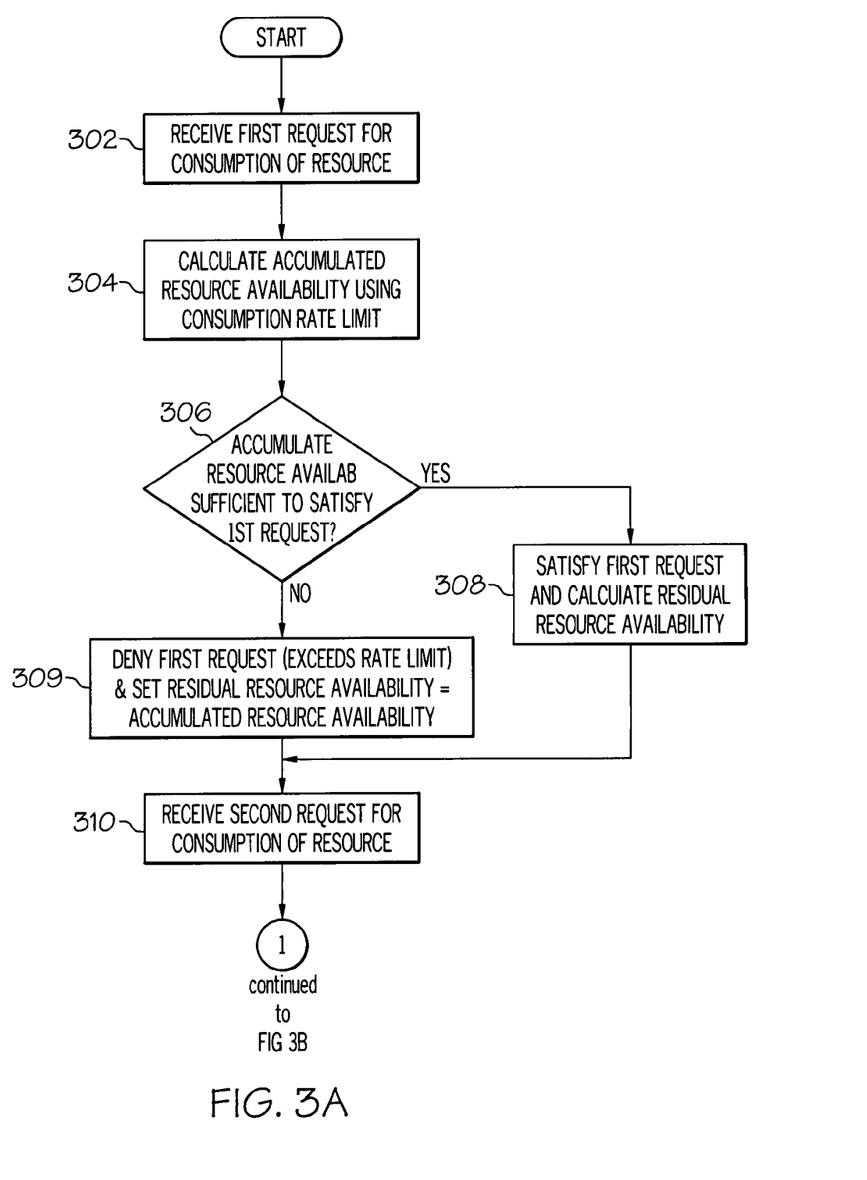
FIGS. 3a and 3b illustrate a flowchart of a method of the resource consumption rate limiter of FIG. 2 in accordance with a preferred embodiment of the present invention.
Figure 3B:
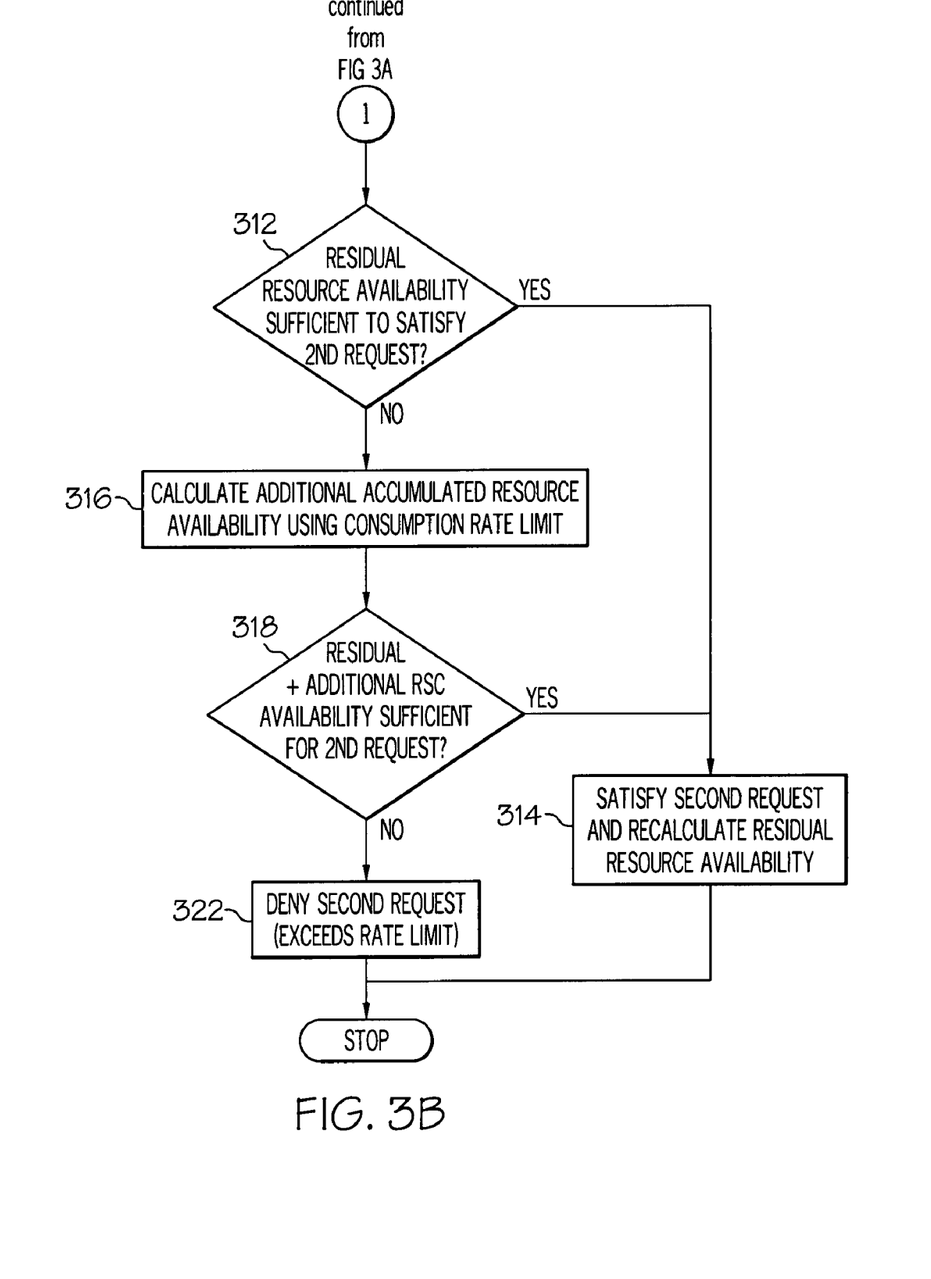

FIGS. 3a and 3b illustrate a flowchart of a method of the resource consumption rate limiter 200 of FIG. 2 in accordance with a preferred embodiment of the present invention. The steps of the method of FIGS. 3a and 3b will now be described with reference to the elements of FIG. 2. Initially, at step 302, the rate limiter 200 receives a first request for the consumption of a quantity of resource 216. At step 304 an accumulated resource availability 208 is calculated using the consumption rate limit 204. This calculation will also require an appropriate time period such as an elapsed time period from a defined point in time to the time when the first request was received. At step 306 the method determines if the accumulated resource availability 208 is sufficient to satisfy the first request. If the accumulated resource 208 is sufficient, the method satisfied the first request at step 308 and calculates the residual resource availability 210. Alternatively, if the accumulated resource 208 is insufficient to satisfy the first request, the method proceeds to step 309 and denies the first request since it would exceed the consumption rate limit 204. In the event of denying the first request, the residual resource availability 210 is taken to have the value of the accumulated resource availability 208 since none of the accumulated resource availability 208 is consumed.

At some point subsequently, the method receives a second request for the consumption of a quantity of the resource 216 at step 310. The method then determines if the residual resource availability 210 is sufficient to satisfy the second request. If the residual resource availability 210 is sufficient, the method satisfies the second request at step 314 and recalculates the residual resource availability 210. The residual resource availability 210 is recalculated to determine the residual resource available after satisfaction of the second request. Alternatively, if the residual resource availability 210 is determined to be insufficient at step 312, the method proceeds to calculate an additional accumulated resource availability 212 using the consumption rate limit 204. The calculation of the additional accumulated resource availability 212 needs to be made in terms of an elapsed time period. The elapsed time period will be the time since the calculation of the residual resource availability 210 (normally the elapsed time since satisfaction of the first resource request was determined). Subsequently, at step 318, the method determines if a combination of the residual resource availability 210 and the additional accumulated resource availability 212 is sufficient to satisfy the second request. The combination can be a summation of the residual resource availability 212 and the additional accumulated resource availability. Preferably, the residual resource availability 210 is updated by addition of the accumulated resource availability 212. If the second request can be satisfied the method proceeds to satisfy the second request and update the residual resource availability 210 at step 314. Alternatively, if the second request cannot be satisfied, the method denies the second request at step 322 since it exceeds the consumption rate limit 204.

Preferably, the calculation of the additional accumulated resource availability 212 at step 316 is undertaken such that the additional accumulated resource availability 212 is constrained to a maximum accumulated resource availability. One way to constrain the additional accumulated resource availability 212 to a maximum value is to constrain the elapsed time used in the calculation of the additional accumulated resource availability 212 to a maximum elapsed time. For example, the elapsed time period will be the time since the calculation of the residual resource availability 210 (normally the elapsed time since satisfaction of the first resource request was determined) and this can be constrained to a predetermined maximum elapsed time. Alternatively, the additional accumulated resource availability 212 can be constrained to a discrete, predetermined, maximum value. In this way, a consumer cannot accrue an excessively large residual resource availability 210 by delaying requests for resource consumption for lengthy periods. This would have the undesirable affect that a request for resource consumption may satisfy the long term consumption rate limit by virtue of the long period of elapsed time whilst nonetheless having a significant and undesirable impact on the operation of the system 214 by virtue of the quantity of resource requested. Thus, such a constraint on the accumulated resource availability 212 addresses the problem of such excessive resource consumption requests. Furthermore, a corresponding constraint can be preferably applied to the accumulated resource availability 208 used for determining whether to satisfy a first resource consumption request.

Figure 4:
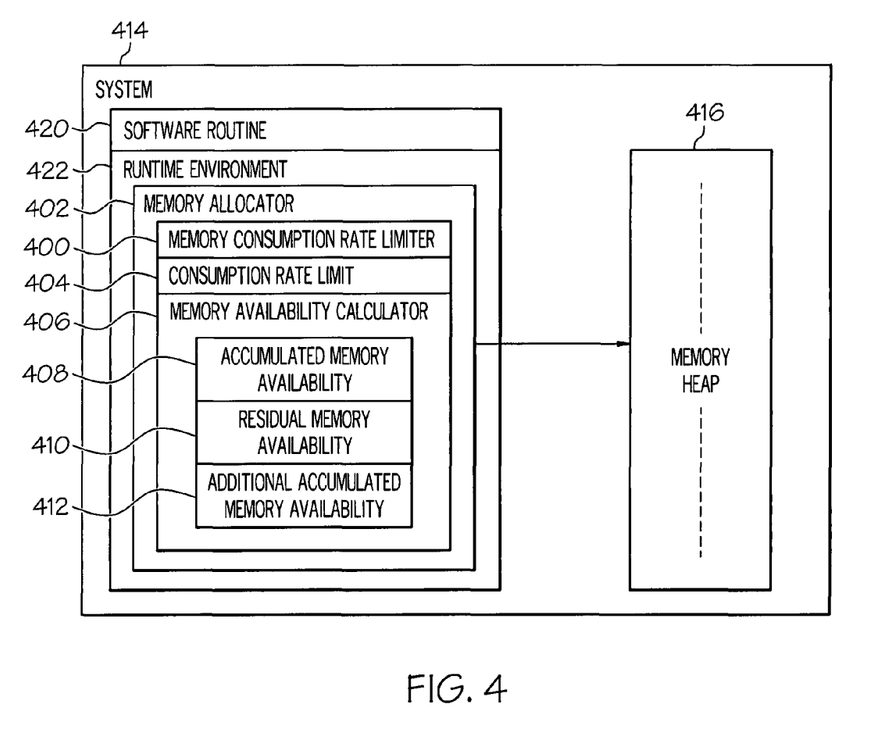
FIG. 4 is a block diagram of an exemplary system executing a software routine with a runtime environment having a memory consumption rate limiter for determining whether to satisfy requests from the software routine for consumption of heap memory in accordance with a preferred embodiment of the present invention.

FIG. 4 is a block diagram of an exemplary system 414 executing a software routine 420 with a runtime environment 422 having a memory consumption rate limiter 400 for determining whether to satisfy requests from the software routine 420 for consumption of heap memory 416 in accordance with a preferred embodiment of the present invention. The software routine 420 can be a software application, function or method running in, with or on the runtime environment 422. For example, the runtime environment 422 is a Java virtual machine (Java is a registered trademark of Sun Microsystems Inc.) or other virtual machine, operating system or runtime environment. The runtime environment 422 provides a memory allocator 402 as a software or hardware entity operable to allocate memory in the memory heap 416 for. The memory allocator 402 includes a memory consumption rate limiter 400 having associated a consumption rate limit 404 and a memory availability calculator 406. The memory availability calculator 406 corresponds generally to the resource availability calculator 206 of FIG. 2 and is specific in the context of FIG. 4 to the memory heap resource 416. For simplicity the heap memory 416 will be considered to comprise blocks of memory and memory allocation requests from the software routine 420 will be defined in terms of a number of such blocks. It will be apparent to those skilled in the art that a memory heap can operate in multiple different ways and may not literally take this form.

In use, the software routine 420 is functional to request an allocation of memory from the memory heap 416 via the memory allocator 402. The memory allocator 402 determines, via the memory consumption rate limiter 400, whether to permit or deny the request for the allocation of memory. The memory consumption rate limiter 400 operates generally in accordance with the method of FIGS. 3a and 3b.

Figure 5:
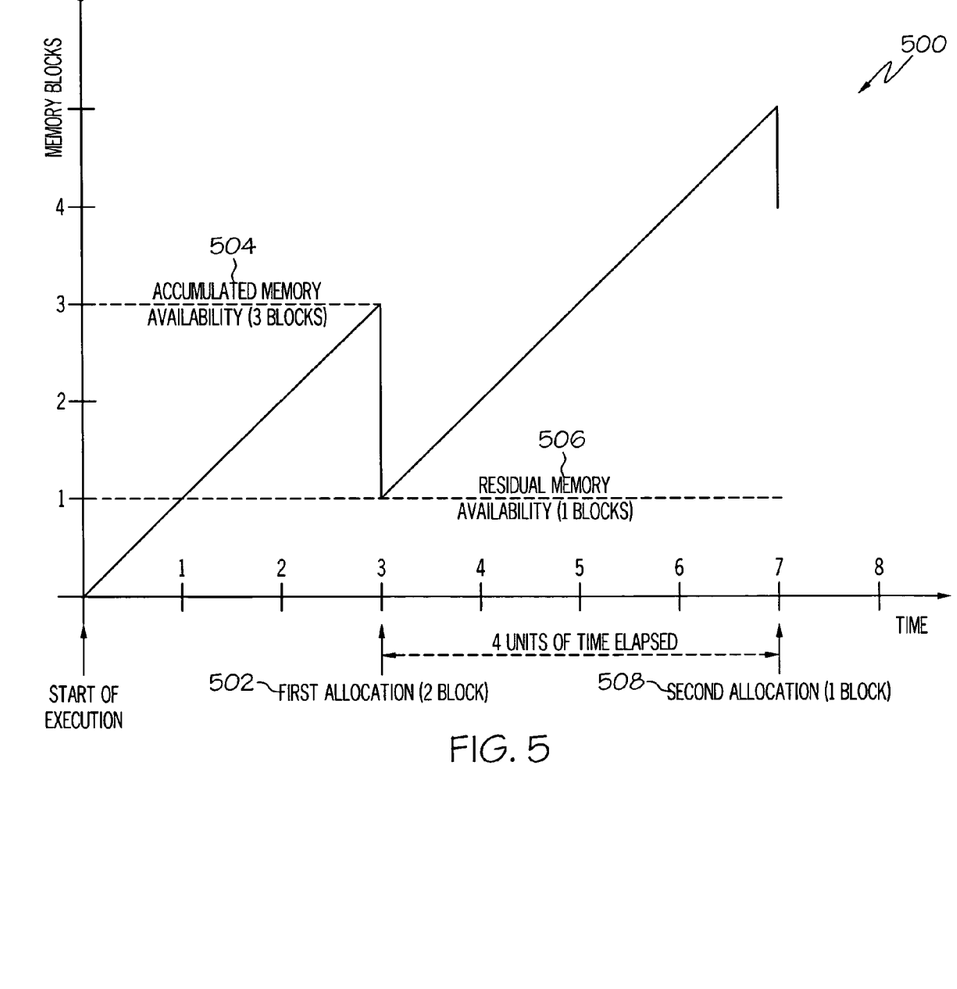
FIG. 5 is a first exemplary graph of accumulated memory block availability by time for the system of FIG. 4 in use in accordance with a preferred embodiment of the present invention.

FIG. 5 is a first exemplary graph 500 of accumulated memory block availability by time for the system 414 of FIG. 4 in use in accordance with a preferred embodiment of the present invention. The graph of FIG. 5 generally illustrates the accumulation of memory blocks available at different times in accordance with a consumption rate limit 404 of one block per unit time. Thus, after one unit of time an additional one block of memory is available to the software routine 420, assuming no blocks are consumed.

At time 502, which is three units of time elapsed from the start of execution of the software routine, the software routine 420 makes a first request to the memory allocator 402 for an allocation of 2 blocks of memory. In accordance with the method of FIGS. 3a and 3b the operation of the memory allocator and the memory consumption rate limiter is as follows. Initially, at step 302, the first request for the allocation of 2 blocks of memory is received after three units of time have elapsed. At step 304 the memory availability calculator 406 calculates the accumulated memory availability 408 at time 502 as a product of the consumption rate limit 404 (which is one block per unit time) and the elapsed time (three units). The accumulated memory availability 408 is therefore three blocks of memory as illustrated at 504. Subsequently, at step 306, the method determines that the accumulated memory availability 408 is sufficient to satisfy the first request 502 for two blocks of memory and the memory allocation request is satisfied at step 308. A residual memory availability 410 is also calculated at step 308 as being the accumulated memory availability 408 of three blocks minus the allocated memory of two blocks. Thus, the residual memory availability 410 is calculated at step 308 to be one block of memory.

Subsequently, at step 310, a second request 508 for the allocation of one block of memory is received at four time units from the calculation of the residual memory availability 410. At step 312 the method determines that the residual memory availability 410 of one block of memory is sufficient to satisfy the second request 508 for one block of memory. Thus, the method satisfies the second request at step 314 and recalculates the residual memory availability 410 by subtracting the memory block allocated in response to the second request. Thus, the residual memory availability 410 is calculated at step 314 to be zero blocks of memory.

Thus in this way it is not necessary for the memory allocator 402 to calculate the additional accumulated memory availability 412 in response to the second request 508 because the memory allocator 402 is able to determine that the residual memory availability 410 following the satisfaction of the first request was sufficient to satisfy the second request. Thus, preferred embodiments of the present invention provide clear advantages over the prior art which will be required to undertake such relatively expensive calculations for each request.

Insofar as embodiments of the invention described are implementable, at least in part, using a software-controlled programmable processing device, such as a microprocessor, digital signal processor or other processing device, data processing apparatus or system, it will be appreciated that a computer program for configuring a programmable device, apparatus or system to implement the foregoing described methods is envisaged as an aspect of the present invention. The computer program may be embodied as source code or undergo compilation for implementation on a processing device, apparatus or system or may be embodied as object code, for example.

Suitably, the computer program is stored on a carrier medium in machine or device readable form, for example in solid-state memory, magnetic memory such as disk or tape, optically or magneto-optically readable memory such as compact disk or digital versatile disk etc., and the processing device utilizes the program or a part thereof to configure it for operation. The computer program may be supplied from a remote source embodied in a communications medium such as an electronic signal, radio frequency carrier wave or optical carrier wave. Such carrier media are also envisaged as aspects of the present invention.

It will be understood by those skilled in the art that, although the present invention has been described in relation to the above described example embodiments, the invention is not limited thereto and that there are many possible variations and modifications which fall within the scope of the invention.

The scope of the present invention includes any novel features or combination of features disclosed herein. The applicant hereby gives notice that new claims may be formulated to such features or combination of features during prosecution of this application or of any such further applications derived therefrom. In particular, with reference to the appended claims, features from dependent claims may be combined with those of the independent claims and features from respective independent claims may be combined in any appropriate manner and not merely in the specific combinations enumerated in the claims.

What is claimed is:

1. A method for enforcing a consumption rate limit for a resource in a data processing system, the method comprising the steps of: receiving a first request for consumption of the resource;
   calculating an accumulated resource availability using the consumption rate limit;
   in response to a determination that the accumulated resource availability is sufficient to satisfy the first request, satisfying the first request;
   calculating a residual resource availability;
   receiving a second request for consumption of the resource;
   calculating an additional accumulated resource availability using the consumption rate limit unless the residual resource availability is sufficient to satisfy the second request;
   wherein the accumulated resource availability is calculated as a product of a first elapsed time and the consumption rate limit, and the additional accumulated resource availability is calculated as a product of a second elapsed time and the consumption rate limit, the first elapsed time is an elapsed time up to the receipt of the first request, and the second elapsed time is an elapsed time between the receipt of the first request and the receipt of the second request.

2. The method of claim 1 wherein the calculating an additional accumulated resource availability further comprises the step of:
   in response to a determination that a combination of the residual resource availability and the additional accumulated resource availability is sufficient to satisfy the second request, satisfying the second request.

3. The method of claim 2 wherein the step of satisfying the second request comprises:
   updating the residual resource availability to include the additional accumulated resource availability; and
   in response to a determination that the updated residual resource availability is sufficient to satisfy the second request, satisfying the second request and recalculating the residual resource availability.

4. The method of claim 3 wherein the additional accumulated resource availability is constrained to a maximum additional accumulated resource availability.

5. The method of claim 2 wherein the additional accumulated resource availability is constrained to a maximum additional accumulated resource availability.

6. The method of claim 2 wherein the combination of the residual resource availability and the additional accumulated resource availability is constrained to a maximum resource availability.

7. The method of claim 2 wherein the resource is a memory in the data processing system.

8. The method of claim 7 wherein the first and second requests for consumption of the resource are requests for allocation of memory.

9. The method of claim 1 wherein the additional accumulated resource availability is constrained to a maximum additional accumulated resource availability by constraining the second elapsed time to a maximum second elapsed time.

10. The method of claim 3 wherein the updated residual resource availability is constrained to a maximum updated resource availability.

11. The method of claim 3 wherein the resource is a memory in the data processing system.

12. The method of claim 11 wherein the first and second requests for consumption of the resource are requests for allocation of memory.

13. Apparatus for enforcing a consumption rate limit for a resource in a data processing system, the apparatus comprising:
    means for receiving a first request for consumption of the resource;
    means for calculating an accumulated resource availability using the consumption rate limit;
    means for, in response to a determination that the accumulated resource availability is sufficient to satisfy the first request, satisfying the first request;
    means for calculating a residual resource availability;
    means for receiving a second request for consumption of the resource;
    means for calculating an additional accumulated resource availability using the consumption rate limit unless the residual resource availability is sufficient to satisfy the second request;
    wherein the accumulated resource availability is calculated as a product of a first elapsed time and the consumption rate limit, and the additional accumulated resource availability is calculated as a product of a second elapsed time and the consumption rate limit, the first elapsed time is an elapsed time up to the receipt of the first request, and the second elapsed time is an elapsed time between the receipt of the first request and the receipt of the second request.

14. The apparatus of claim 13 wherein the means for calculating an additional accumulated resource availability further comprises means for, in response to a determination that a combination of the residual resource availability and the additional accumulated resource availability is sufficient to satisfy the second request, satisfying the second request.

15. The apparatus of claim 14 wherein the means for satisfying the second request comprises:
    means for updating the residual resource availability to include the additional accumulated resource availability; and
    means for, in response to a determination that the updated residual resource availability is sufficient to satisfy the second request, satisfying the second request and recalculating the residual resource availability.

16. An apparatus comprising:
a central processing unit;
a memory subsystem;
an input/output subsystem; and
a bus subsystem interconnecting the central processing unit, the memory subsystem, the input/output subsystem; and the apparatus as claimed in any of claims 13 and 15.

17. A computer program product comprising a computer readable storage medium having stored thereon computer program code to, when loaded into a computer system and executed thereon, cause the computer to perform the steps of a method as claimed in claim 1.

* * * * *